United States Patent [19]

Groll et al.

[11] Patent Number: 5,791,746
[45] Date of Patent: Aug. 11, 1998

[54] VALVE ARRANGEMENT FOR CONTROLLING THE BRAKE PRESSURE IN A VEHICLE HYDRAULIC POWER-BRAKE SYSTEM

[75] Inventors: Emanuel Groll, Stuttgart; Peter Woll, Bruchsal, both of Germany

[73] Assignee: Mercedes-Benz AG, Germany

[21] Appl. No.: 669,696

[22] Filed: Jun. 24, 1996

Related U.S. Application Data

[63] Continuation of PCT/EP94/04279 Dec. 22, 1994.
[51] Int. Cl.⁶ ................................................ B60T 13/14
[52] U.S. Cl. ........................................ 303/113.4; 91/434
[58] Field of Search ............................. 303/155, 114.1, 303/DIG. 1, DIG. 2, 64, 85, 3, 10, 11, 113.4, 84.1, 900; 91/434, 433

[56] References Cited

U.S. PATENT DOCUMENTS

| | | | |
|---|---|---|---|
| 3,764,183 | 10/1973 | Treichel et al. | 303/54 |
| 4,796,959 | 1/1989 | Seibert et al. | 303/113.4 X |
| 5,098,171 | 3/1992 | Siegel | 303/113.4 |

FOREIGN PATENT DOCUMENTS

| | | | |
|---|---|---|---|
| 0 249 030 | 12/1987 | European Pat. Off. | |
| 35 09 980 | 9/1986 | Germany | |
| 4112134 | 12/1992 | Germany | 303/113.4 |
| 2 204 926 | 11/1988 | United Kingdom | |

OTHER PUBLICATIONS

International Search Report dated Apr. 18, 1985.

*Primary Examiner*—Josie Ballato
*Attorney, Agent, or Firm*—Evenson, McKeown, Edwards & Lenahan, P.L.L.C.

[57] ABSTRACT

The invention provides a valve arrangement for controlling the brake pressure in a hydraulic power-brake system. By actuating a brake valve, a brake pressure proportional to the actuation force builds up in an outlet pressure chamber, with a first ball-seat valve. By displacing an actuation piston from its normal open position in which the outlet pressure chamber is connected to a relief chamber which is continuously kept free of pressure, the first ball-seat valve can be adjusted into a blocking position. After the first ball-seat valve has closed, further axial displacement of the actuation piston, (out of its normal blocking position, in which an inlet pressure chamber which is subjected to the high outlet pressure of a pressure accumulator is blocked off with respect to the outlet pressure chamber) moves a second ball-seat valve into its open position. The latter ball-seat valve, however, again assumes its blocking position as an equilibrium position which corresponds to equality between the actuation force and a reaction force resulting from the application of pressure to a piston face of a control piston, which is subjected to the outlet pressure. The pressure-medium flow path, which can be cleared by opening the second ball-seat valve, is provided with a restrictor which limits the maximum rate of increase of the brake-pressure.

13 Claims, 4 Drawing Sheets

VALVE ARRANGEMENT FOR CONTROLLING THE BRAKE PRESSURE IN A VEHICLE HYDRAULIC POWER-BRAKE SYSTEM

This application is a continuation of International Patent Application No. PCT/EP94/04279, filed Dec. 22, 1994.

BACKGROUND AND SUMMARY OF THE INVENTION

The invention relates to a valve arrangement for controlling the brake pressure in a hydraulic power-brake system of a road vehicle, of the type in which, by actuating a brake valve, a pressure which is proportional to the actuation force can be built up in an outlet pressure chamber connected to a brake circuit of the vehicle. This pressure can be varied between the high outlet pressure level of a pressure accumulator provided as a pressure source, and a lower pressure level corresponding to the low ambient pressure of the brake fluid reservoir vessel of the brake system.

A valve arrangement of this kind is disclosed in German patent document DE-35 09 980 A1. In that device, the brake valve comprises a first 2/2 way ball-seat valve, which acts as an outlet valve and has two positions: a blocking position and an open position, the open position being assumed as the normal position, in which the outlet pressure chamber has a continuously communicating connection to the brake fluid reservoir vessel. The first ball-seat valve can be adjusted into its blocking position out of its open position as a result of axial displacement of an actuation piston, on which the actuation force which is applied via the brake pedal engages via a pedal-travel simulation spring. A second 2/2 way ball-seat valve acts as a pressure-inlet valve. After the first ball-seat valve has moved into its blocking position, upon further axial displacement of the actuation piston and of a control piston, the second ball-seat valve moves out of its blocking position, previously assumed as a normal position, in which an inlet pressure chamber of the brake valve, which is continuously subjected to the high outlet pressure of the accumulator, is blocked off from the outlet pressure chamber of the said brake valve, into its open position which connects these two valve chambers to one another. The second ball-seat valve assumes its blocking position again, as the actuation piston reaches an equilibrium position in which the actuation force acting on the actuation piston equals the reaction force which is directed counter thereto, and results from the application of pressure to a piston reaction face which is subjected to the outlet pressure of the brake valve.

The valve ball of the ball-seat valve which functions as an inlet valve is pressed onto its seat by a biased valve spring, which produces only a relatively low "closing" force. In addition, the ball is also subjected to a substantially larger force which is directed in the same direction as this closing force, as a result of application of the high outlet pressure of the auxiliary pressure source on an effective face which corresponds to the face bounded by the seat. The latter force is compensated in the known valve arrangement by the force of a reaction piston which is supported with a narrow plunger on the side of the valve ball opposite the valve spring. The end face of the plunger which faces away from the ball (and is equal to or approximately equal to the seat face of the ball-seat valve), forms an axially movable boundary of a reaction chamber which also receives the high outlet pressure of the auxiliary pressure source, so that the pressure on the valve ball is equalized. Thus only the closing force of the valve spring must be overcome in order to open the valve. The axial displacement of the reaction piston necessary to open the inlet valve is achieved by means of a link arrangement which comprises a push rod and a driver lever connected thereto in an articulated fashion. The driver lever is pivotably mounted on the valve housing and, upon further displacement of the actuation piston after the closing of the outlet valve, initially executes a small idle motion before it comes to rest against a stop shoulder of the reaction piston. Upon still further displacement of the actuation piston, the driver lever carries the reaction piston along with it so that the valve ball now lifts off the inlet valve from its seat.

The pressure which now builds up in the outlet pressure chamber of the brake valve and to which the actuation piston is subjected over its entire cross-sectional area when the outlet valve is closed, results in a force which presses the actuation piston back counter to the actuation force acting on it, so that the actuation piston is increasingly pushed back again. As a result, the inlet valve closes again and an equilibrium position is produced in which both ball-seat valves of the brake valve are closed. The pressure at the outlet pressure chamber, which is used as brake pressure, is proportional to the actuation force in this equilibrium position.

In the known valve arrangement, when the valve ball of the inlet valve is lifted from its seat by the axial displacement of the reaction piston, that portion of the force which was previously pressing the ball onto its seat (and which resulted from the outlet pressure of the auxiliary pressure source) is eliminated, so that the reaction piston (which continues to receive the outlet pressure of the auxiliary pressure source on its piston face which faces away from the valve ball), spontaneously moves rapidly into a position which lifts the ball far from its seat before, as a result of its deflection, the link arrangement reacts by opening the outlet valve.

The result is a sudden response of the vehicle brake system with a high pressure rate of increase in the outlet pressure chamber of the brake valve. This response is not only uncomfortable, but can also be dangerous in cases in which the vehicle has to be braked on a slippery carriageway. In addition, the link arrangement which is provided in order to achieve the desired "switch-on" hysteresis, and which is intended to ensure that when a brake-pressure build-up actuation of the brake valve takes place, the inlet valve does not open until the outlet valve is closed, results in the design of the known brake valve being constructionally complicated, and the manufacturing technology being correspondingly costly.

Another brake valve, which is disclosed in German patent document DE-AS 51 175 096, is subject to essentially the same functional disadvantages. Although it can be realized with a relatively simple design, it is problematic from the standpoint of safety because the valve balls of both seat valves are rigidly connected to one another and therefore both seat valves must change their functional positions at the same time.

German patent document DE-30 01 654 A1 discloses a brake valve which is provided on a towing vehicle, and has the purpose of supplying pressure to the brake system of a trailer. The brake valve in this device is a 5/3 way valve, which can be actuated by means of an inert mass which can be displaced forward and rearward relative to the direction of travel, as a result of braking of the towing vehicle. The brake valve has a spring-centered normal position which is arranged between a constricted brake-pressure build up position and a constricted brake-pressure reduction position, which are assigned to the partial braking range. In addition, an unrestricted brake-pressure build up position and a likewise unrestricted brake-pressure reduction position are assigned to the full braking mode. The respective brake pressure is fed back to the pressure reduction side of the brake valve, so that the brake valve acts as a proportional valve. In the case of braking to achieve a rapid deceleration this brake valve can also generate an unfavorably rapid increase in the brake pressure in the brake system of the trailer, since then the pressure build up position of the known brake valve which brings about constriction is very rapidly cancelled—"jumped over".

The object of the present invention is therefore to provide an improved valve arrangement of the type mentioned at the beginning, suitable for controlling brake pressure in a hydraulic power-brake system, which maintains a relatively simple design, and also makes possible better metering of the brake pressure in terms of largely avoiding jumps in pressure.

This object is achieved by the brake valve arrangement according to the invention, in which the pressure-medium flow path leading from the pressure accumulator to the wheel brakes (via the inlet pressure chamber, the ball-seat valve and the outlet pressure chamber of the brake valve as well as the main brake line of the brake circuit connected to the outlet pressure chamber), which can be cleared by opening-actuation of the second ball-seat valve which functions as inlet valve, is provided with a restrictor that limits the maximum value of the brake-pressure rate of increase to a prescribed value. Together with the arrangement of the actuation piston and of the valve seats of the two ball-seat valves and the design and dimensioning of the actuating piston as provided above, this configuration achieves an overall simple valve arrangement which, upon application of brake-pressure to actuate the valve arrangement, reliably prevents the inlet valve from opening until the outlet valve has moved into its blocking position, so that direct overflowing of highly pressurized brake fluid to the tank is prevented.

On the other hand this arrangement also makes it possible to avoid drastic increases in brake pressure when the inlet valve opens, while still maintaining the ability to meter the brake pressure in a sensitive way, which benefits both the driving comfort and driving safety. Even if a portion of the closing force of the valve (which is conditioned by the outlet pressure of the accumulator and which can be kept small by dimensioning the seat of this ball valve to have small area) is eliminated during the opening actuation of the inlet valve, so that the control piston can execute a relatively large starting travel, the effect of the starting travel is effectively compensated by the restrictor, which limits the brake-pressure rate of increase in accordance with demand.

Moreover, because of the further restrictor (whose restrictor gap is bounded by a tubular section of the housing and the valve ball of the second ball-seat valve), immediately after the valve ball lifts off from its seat and within an appreciable range of its starting travel (that is, up to settings which correspond to average brake pressures), the valve ball is pressed into contact with the actuation plunger of the inlet valve by the dynamic effect of the brake fluid flowing from the inlet pressure chamber into the outlet pressure chamber via the restrictor gap to the valve seat, and the through-passage of the inlet valve. Therefore, as long as the valve ball is still arranged within a tubular section of the valve housing which bounds the restrictor gap, it contributes to the reaction force which can be perceived at the brake pedal, thus facilitating sensitive metering of the brake pressure, particular in the region of low vehicle decelerations. By matching this "dynamic" restrictor and the restrictor which limits the brake-pressure rate of increase, it is possible to achieve various actuation force/brake-pressure characteristics which correspond to a desired response behavior of the brake system. Thus, the valve arrangement according to the invention can even be adapted to very different types of vehicles, with very different weights.

With the insertion into the vehicle brake system, of the restrictor, which limits the maximum value of the brake-pressure rate of increase by means of hydraulic switching technology, the restrictor is expediently constructed as an adjustable restrictor which permits a desired brake-pressure rate of increase to be adjusted.

If this restrictor is constructed as a discrete functional element, separate from the brake valve, it is particularly advantageous if a bypass flow path is provided via which a rapid reduction in brake pressure is possible. Such a hydraulic flow path which is parallel with the restrictor is not required, on the other hand, if the restrictor is integrated into the brake valve, in which case the restrictor can be realized in a constructionally simple way. For the further restrictor which is integrated into the brake valve and whose restrictor gap is bounded by the valve ball of the second ball-seat valve, expedient measures for the configuration of its opening travel and the design of the housing component which bounds its restrictor gap are specified hereinafter.

In brake systems which utilize the valve arrangement according to the invention, it is also possible to achieve a desired response behavior of a brake system by specifying pedal-travel characteristic curves, brake-pressure characteristic curves or brake-force characteristic curves. For this purpose, an advantageous range of the ratio $C_B/C_R$, of the spring rate $C_B$ of a transmission spring (for transmitting the actuation force which originates from the driver to the actuation piston of the valve arrangement) relative to the spring rate $C_R$ of a reaction spring (utilized as a travel simulation spring), is between 6 and 12, and is preferably 10. The utilization of such high values of the ratio $C_B/C_R$ is possible since the ball-seat valves of the valve arrangement can be realized with very small cross-sections of the valve passages through which the brake fluid flows.

According to a feature of one embodiment of the invention, initially a small idle motion of the pedal arises at the start of a braking operation, which is desirable for ergonomic reasons so that, when the valve arrangement is in fact actuated, this actuation already occurs counter to an appreciable restoring force.

Other objects, advantages and novel features of the present invention will become apparent from the following detailed description of the invention when considered in conjunction with the accompanying drawings.

DETAILED DESCRIPTION OF THE DRAWINGS

Figure 1:
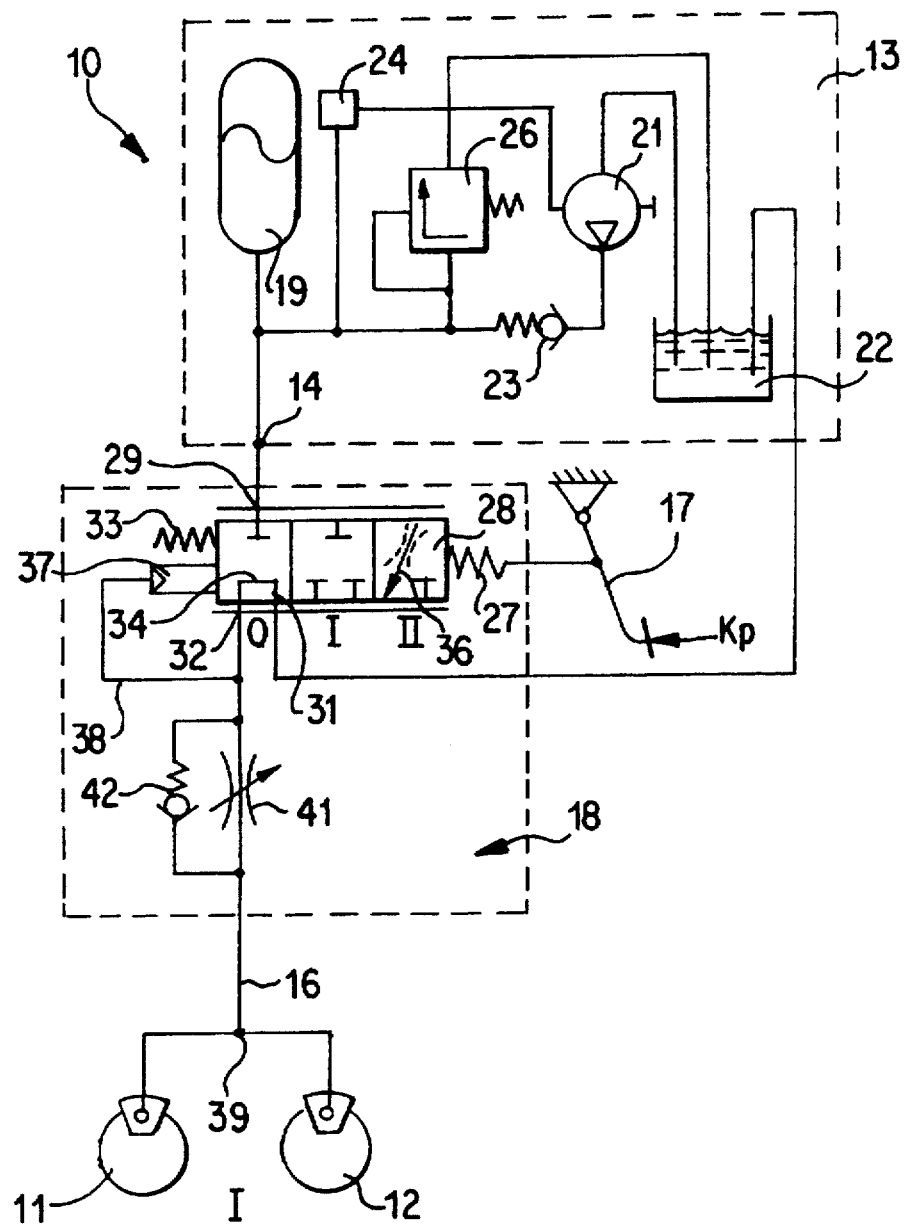
FIG. 1 shows a schematically simplified hydraulic diagram of a hydraulic power-brake system with a valve arrangement, according to the invention, for controlling brake pressure.

FIG. 1 represents a hydraulic power-brake system 10 for a road vehicle, which may be assumed to be a multi-circuit (in particular double-circuit) brake system. By means the components assigned to the respective brake circuits (for example, the front-axle brake circuit I depicted in FIG. 1), including a pressure supply unit 13 and a valve arrangement 18 connected between the pressure outlet 14 and the main brake line 16 of the brake circuit I, the wheel brakes 11 and 12 can be actuated by the brake pedal 17. That is, a pressure derived from the outlet pressure of the pressure supply unit 13, and proportional to the force $K_P$ with which the driver actuates the brake pedal 17, is applied to the wheel brakes 11, 12 of the brake circuit I.

The pressure supply unit 13 is configured for a high outlet pressure of about 200 bar which can be used as a maximum brake pressure, and which is provided at an essentially constant pressure level at the pressure outlet 14. The pressure supply unit 13 comprises, in a customary configuration, a pressure accumulator 19, an electrically drivable high-pressure pump 21 by means of which brake fluid can be fed from a brake-fluid reservoir vessel 22, which is at the ambient atmospheric pressure, via an accumulator charging valve 23 (illustrated as a non-return valve) into the pressure accumulator in order to charge it, a pressure switch 24 which controls the charging operation of the high-pressure pump 21 and which switches on the pump 21 when the outlet pressure of the accumulator 19 drops below a limit value of for example 180 bar, and switches the pump off again when the accumulator has been charged again to a pressure of 220 bar, and a pressure-limiting valve 26 which provides additional protection against charging the pressure accumulator 19 to an excessively high pressure value.

The valve arrangement 18 controls the brake pressure. It comprises a brake valve 28, which can be actuated by means of the brake pedal 17 via a travel simulator 27 (illustrated as a compression spring). The brake valve 28 applies a pressure proportional to the force $K_P$ with which the driver actuates the brake pedal 17, as brake pressure to the main brake line 16, which branches to the wheel brakes 11, 12, of the brake circuit I. With this arrangement, it is possible to vary infinitely the pressure in line 16 between the ambient atmospheric pressure (the pressure prevailing in the reservoir vessel 22 of the brake system 10) as a minimum value, and the outlet pressure of the accumulator 19, as a maximum value.

Figure 2:
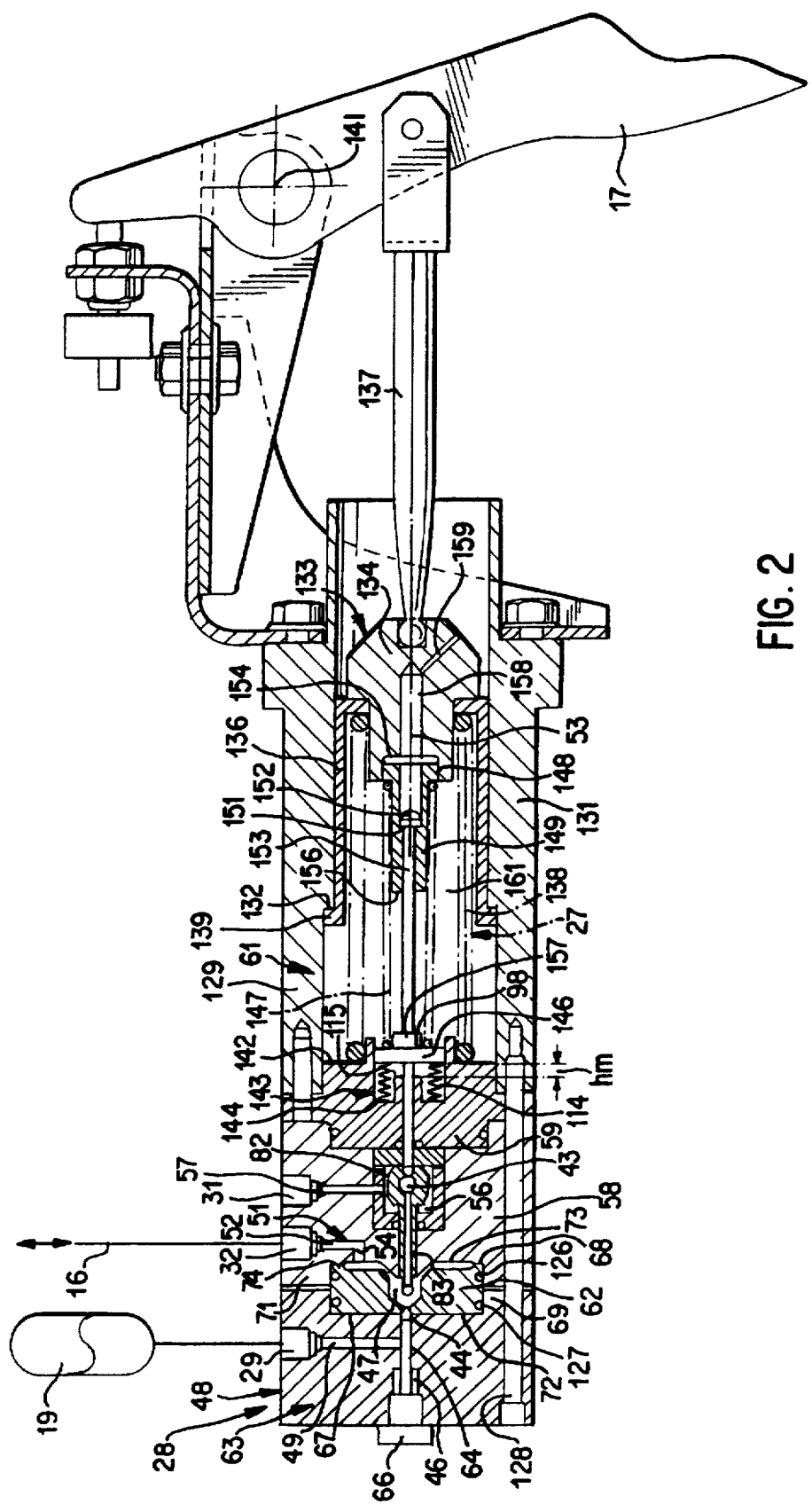
FIG. 2 shows a view of a longitudinal section of a brake valve which is provided within the scope of the brake system according to FIG. 1 for controlling brake pressure and has an inlet valve which is constructed as a ball-seat valve and an outlet valve which is likewise constructed as a ball-seat valve, shown in section along the central axis of the brake valve.
Figure 3:
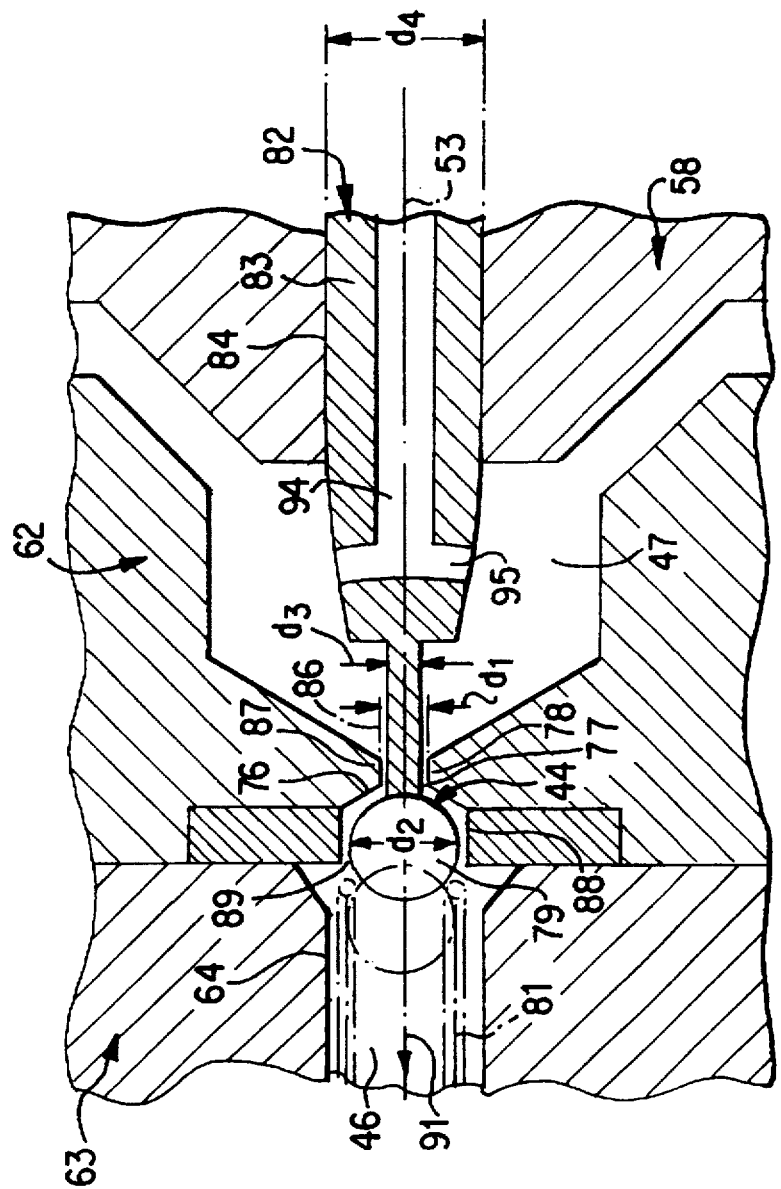
FIG. 3 shows the inlet valve of the brake valve according to FIG. 2.

The brake valve 28 is shown in greater detail in FIGS. 2 and 3. As shown in FIG. 2, it has a high-pressure port 29 which is connected to the pressure outlet 14 of the pressure supply unit 13. A return port 31 is connected to the brake-fluid reservoir vessel 22 of the pressure supply unit 13, and depending on the position of the brake pedal 17, a larger or smaller brake pressure is made available at a brake-circuit port 32.

The brake valve 28 is constructed as a 3/3 way valve which, in the non-actuated state of the brake system 17, is held in its normal position 0 by a restoring spring arrangement (illustrated as a valve spring 33). In the normal position 0 (FIG. 1) the brake-circuit port 32 is connected via a recirculation flow path 34 of the brake valve 28 to the return port 31 (and thereby also to the brake-circuit reservoir vessel 22 of the pressure supply unit 13), while the high-pressure port 29 is blocked off with respect to ports 32, 31. When the brake pedal 17 is actuated, it initially moves into an operational position I, a blocking position, in which all the valve ports 29, 31, 32 are blocked off with respect to one another. (See FIG. 1.) Further actuation of the brake valve 28 counter to the increasing restoring force of the valve spring 33, moves the brake valve 28 into an operational position II in which the high pressure port 29 is connected to the brake-circuit port 32 via a control path 36 (which is cleared in this operational position), and the brake-circuit port 32 and the high pressure port 29 are blocked off with respect to the return port 31.

By feeding back (represented symbolically in FIG. 1 by a hydraulic control chamber 37 and its connection to the brake-circuit port 32 via a control line 38) the pressure building up at the brake-circuit port 32, a force is produced which increases as this pressure increases, is in the same direction as the restoring force of the valve spring 33, and is opposed to the actuation force $K_P$. This force thus presses the brake valve 28 back into its operational position I, which becomes the equilibrium position if, during a braking operation, the value of the vehicle deceleration corresponding to the driver's requirements is reached and the driver therefore maintains a constant actuation force $K_P$ with which he "depresses" (actuates) the brake pedal 17.

If the driver partially releases the brake pedal 17 in order to decrease the brake pressure and reduce vehicle deceleration, the brake valve moves into a configuration of cleared and blocked-off flow paths corresponding to the normal position 0, until the blocking position I of the brake valve 28 is reached again as the equilibrium position in which the brake pressure corresponds to the value of the vehicle deceleration desired by the driver. In the case of "complete" release of the brake pedal 17 as far as its normal position, the brake valve 28 also moves "immediately" into its normal position 0 which corresponds to the maximum opening cross-section of the circulation flow path 34 and to the largest rate of decrease of the brake-pressure.

As shown in FIG. 1, the valve arrangement 18 comprises a restrictor 41 which is connected between the brake-circuit port 32 of the brake valve 28 and the branching point 39 of the main brake line 16, as well as a non-return valve 42 which is connected parallel thereto. The non-return valve 42 is urged in the blocking direction by the pressure at the brake-circuit port 32 (which is greater than in the main brake line 16), and in the opening direction by pressure in the wheel brakes 11, 12 (which is greater than at the brake-circuit port 32).

In the case of a rapid increase of brake-pressure due to actuation of the brake valve 28, the restrictor 41 limits the rate at which brake-pressure builds up in the wheel brakes 11, 12 of the brake circuit I, so that the brake pressure does not rise too suddenly, starting from a specific minimum actuation force (and thus also a minimum pedal travel, which, as a result of static friction of sealing elements on valve elements which can move in relation to one another, have to be implemented before the brake valve responds). Rather, with this arrangement, brake-pressure in the wheel brakes 11, 12 instead can be increased in a well metered way as is most expedient for both "gentle" targeted braking and full braking which must be controlled satisfactorily. At the same time, the non-return valve 42 also permits the brake pressure to decrease very rapidly in accordance with the release of the pedal, so that, except when the vehicle is decelerated by the over-run conditions of the vehicle engine, an essentially deceleration-free operating state of the vehicle can be achieved rapidly again in accordance with the driver's wishes.

If, as illustrated by the unbroken line in FIG. 1, the restrictor 41 is constructed as an "independent", discrete component which is inserted into the main brake line 16 between the brake valve 28 and the branching point 39 on the main brake line 16, the said restrictor 41 is expediently constructed as an adjustable restrictor whose flow resistance is adjustable. As a result, it can be adapted in order to obtain a desired response behavior of the brake system 10.

The restrictor 41 can also be integrated into the brake valve 28 (as illustrated in FIGS. 2 and 3 explained hereinafter) and can be constructed as a non-adjustable restrictor. A bypass valve such as the non-return valve 42 according to FIG. 1 is then not required.

FIG. 2 shows an embodiment of the invention in which the restrictor 41 of FIG. 1 is integrated into the brake valve 28. The brake valve 28 comprises a first ball-seat valve 43 which functions as a 2/2 way valve. In its normal position 0 (shown in FIG. 2), valve 43 clears the circulation flow path 34 (FIG. 1) leading from the brake-circuit port 32 to its return port 31, thus forming inside the brake valve 28 an outlet valve which relieves the pressure on the wheel brakes 11 and 12. (The said wheel brakes 11 and 12 are connected to the brake-circuit port 32 of the brake valve 28 via the main brake line 16 of the brake circuit I.)

The brake valve 28 also comprises a second ball-seat valve 44 which also functions as a 2/2 way valve. In its normal (blocking) position, which corresponds to the non-actuated state of the brake system, valve 44 blocks off an inlet pressure chamber 46 (which has an uninterrupted connection via the high-pressure port 29) from an outlet pressure chamber 47, to which the brake-circuit port 32 is continuously connected.

When the brake system 10 is activated by actuation of the brake valve 28, this second ball-seat valve 44 does not open until the first ball-seat valve 43 has moved—as a result of the actuation of the brake valve 28—into its blocking position. The second ball-seat valve 44 thus forms an inlet valve which in its open position clears the through-flow path (reference numeral 36 in FIG. 1) and via which highly pressurized brake fluid can overflow out of the pressure accumulator 19 into the outlet pressure chamber 47 of the brake valve 28.

The housing 48 which receives the two ball-seat valves 43 and 44 and the further functional elements which actuate them and return them to their respective normal positions, is axially symmetrical with respect to the central longitudinal axis 53, except for the "one-sided" arrangement of the high-pressure port 29 (and a radial passage 49 which connects it to the inlet pressure chamber 46), the brake-circuit port 32 (and passage 51 which connects it to the outlet pressure chamber 47 and is formed by a radial spur 52 and an axial spur 54 which starts from a radially outer area of the outlet pressure chamber 47 and is arranged at a radial distance from the central longitudinal axis 53 of the housing 48), as well as the return port 31 (and a radial relief passage 57 which connects it in communication with a central relief chamber 56).

The valve housing 48 is of multi-component design. It comprises a central housing block 58 which includes the relief chamber 56, the return port 31, relief passage 57 which connects the latter to the relief chamber 56, the brake-circuit port 32 and the passage 51 which connects the latter to the outlet pressure chamber 47.

The central housing block 58, which is precisely centered with respect to the central longitudinal axis of the brake valve 28, is connected to an elongated housing component 61 in the form of a thick-walled tube, and is arranged at the pedal-end, via a first centering element 59 in the form of a solid block.

A second centering element 62 is arranged at the end face of the central housing block 58 opposite the first centering element 59. It connects the block 58 to a housing termination block 63, of solid design, in an arrangement which is precisely centered with respect to the central axis 53 of the brake valve 28. The housing termination block 63 includes the inlet pressure chamber 46, which is delimited by a central hole 64 extending in the axial direction, and is closed off in a pressure-tight way by a plug 66. The inlet pressure chamber 46 is connected in communication with the high-pressure port 29 via the radial passage 49, and the pressure accumulator 19 is connected to the high-pressure port 29.

The second centering element 62 comprises a thick-walled disc which positively locks in engagement with flatpot-shaped depressions 67 and 68 on opposing end faces of the housing termination block 63 and the central housing block 58. (The latter depressions are delimited in the radial direction by annular ribs 69 and 71 of the housing termination block 63 and the central housing block 58, respectively.) The second centering element thus centers the housing block 58 and the termination block 63 with respect to the central axis 53 of the brake valve housing 48.

While the second centering element 62 is supported with its planar annular end face 72 over a large area, on the planar annular end face 67 of the housing termination block 63 (which forms the base of its flatpot-shaped depression 67), on the opposing annular base face 73 of the pot-shaped depression 68 in the central housing block 58, it is supported only via a narrow peripheral annular rib 74, which projects forwards a small distance in the axial direction. As a result, an axial spacing is created between the second centering element 62 and the base are a 73, thereby providing space for the outlet pressure chamber 47 of the brake valve 28, which outlet pressure chamber 47 is delimited by the second centering element 62 and the central housing block 58.

The inlet valve 44, which is constructed as a ball-seat valve, is shown in greater detail in FIG. 3. It has a conical valve seat 76 which coaxially surrounds the mouth opening 77, facing the inlet pressure chamber 46, of a central through-hole 78 of the second centering element 62. The mouth opening 77 opens inside the second centering element 62 into a central, conically widening area of the outlet pressure chamber 47. The diameter $d_1$ of this central through-hole 78 is significantly smaller than the diameter $d_2$ of the valve ball 79 of the inlet valve 44, the ratio $d_1/d_2$ having a value of about ⅓. The angle of the aperture of the conical valve seat 76 relative to the central longitudinal axis 53 of the brake valve 28, being between 60° and 70°, is relatively large so that, when the valve ball 79 is seated against the valve seat 76, the circular contact line between the valve ball 79 and its seat 76 extends in the immediate vicinity of the edge of the mouth opening 77 of the second centering element 62 or is formed by this edge of the mouth opening 77 itself.

The maximum force $K_S$ necessary to open the inlet valve 44, at the start of a braking operation (i.e. when the outlet pressure chamber 47 is still unpressurized and the valve ball 79 is pressed against the valve seat 76 by the action of the pressure $P_S$ prevailing in the input pressure chamber 46 and by the biasing of a valve spring 81, which engages at one end with the valve ball 79, axially penetrates the inlet pressure chamber 46, and is supported at its other end on the closure plug 66), is then closely approximated, by the relation $$K_S = (F_1 \cdot P_S) + K_R \qquad (1)$$

in which $F_1$ designates the clear cross-sectional area of the central through-hole 78 of the second centering element 62 and $K_R$ designates the effective restoring force of the valve spring 81 whose value is equivalent to a pressure of only a few bars.

The valve 44 is opened by axial displacement of a control piston 82 which is guided in a narrow tubular guide section in an axial guide hole 84, of the central housing block 58. In the exemplary embodiment illustrated, the axial guide hole 84 is aligned with the hole which forms the inlet pressure chamber 46, of the housing termination block 63. The end of the control piston which projects into the outlet pressure chamber 47 merges with a narrow actuation plunger 86, which acts on the valve ball 79 to open the inlet valve 44.

The diameter $d_1$ of the central through-hole 78 of the second centering block 62 and the diameter $d_3$ of the actuation plunger 86 are related to one another such as to form an annular passage, which is cleared in the opened state of the inlet valve 44 and which is bounded radially on the outside by the hole 78 and radially on the inside by the actuation plunger 86. Due to the relative dimensioning of the hole 78 and of the actuation plunger 86, this passageway acts as a restrictor, which effectively limits the rate of increase of pressure in the outlet pressure space 47 of the brake valve 28, even if the valve ball 79 has already moved (and even starting from the onset of the braking operation) into the maximum axial distance from the valve seat which corresponds to the maximum opening travel of the valve ball 79.

Between the conical valve seat 76 and the area formed by the axial hole 64 in the housing termination block 63 (which forms the inlet pressure chamber 46), there is a short intermediate tubular section 88 whose clear diameter is smaller than that of the central hole 64, and only slightly larger than the diameter $d_2$ of the valve ball 79. Thus, between the valve ball 79 and the tubular section 88 of the central passage of the second centering element, there is an annular restrictor gap 89 whose width initially remains constant when the ball 79 is displaced in the opening direction of the valve 44, i.e. in the direction of the arrow 91. This width does not increase appreciably until the ball 79, as it were, leaves the tubular section 88 and moves into the vicinity indicated by broken lines, which corresponds to the maximum displacement travel of the control piston 82. As a result of the drop in pressure which occurs via this restrictor gap 89 during opening-actuation of the inlet valve, there is produced, in addition to the restoring force $K_R$ of the valve spring 81, a force which presses the valve ball 79 into contact with the actuation plunger 86 of the control piston 82 and counteracts the actuation force exerted by the driver, thus contributing to providing at the brake pedal 17 a realistic indication of the brake pressure applied to the wheel brakes 11, 12.

Figure 4:
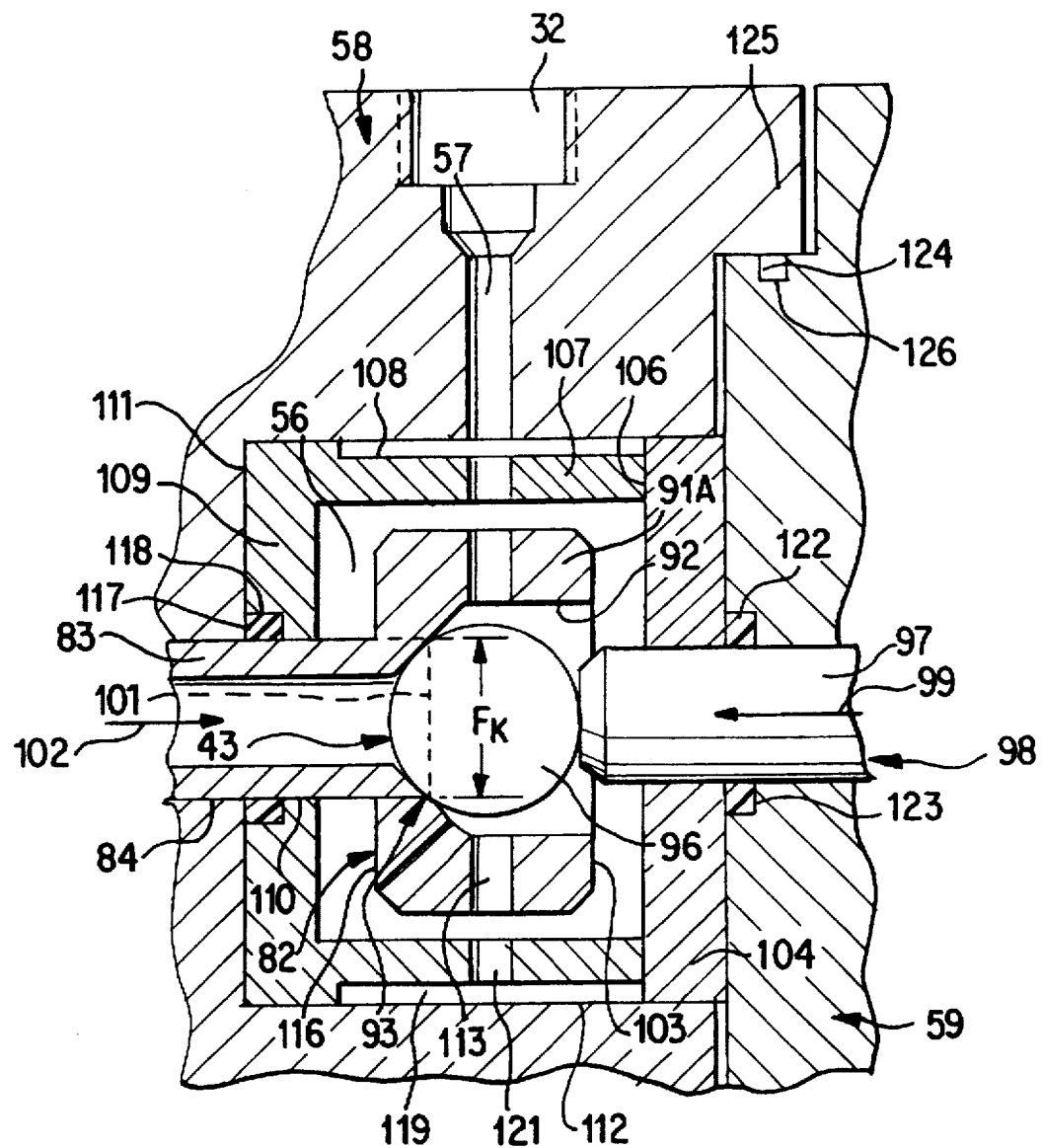
FIG. 4 shows the outlet valve of the brake valve according to FIG. 2 in a sectional view which corresponds to the view in FIG. 2 but is on a larger scale.

As best shown in FIG. 4, the control piston 82 has a block-shaped flange 91A which is arranged inside the central relief chamber 56 and has an axially continuous hole 92 which adjoins the tubular guide section 83 of the control piston 82 via a conical valve seat which tapers towards the central hole 94 in the tubular guide section 83 of the control piston 82. This central hole 94 of the guide-section 83 has a continuously communicating connection to the outlet pressure chamber 47 via a transverse hole 95 which is arranged on the end section, provided with the actuation plunger 86, of the guide section 83 (FIG. 3).

When the brake pedal 17 is actuated, an actuation force $K_B$ acts on the valve ball 96 in the direction of the arrow 99 via an axial plunger 97 of an actuation piston 98, which can be displaced forwards and backwards. As long as braking is taking place and at the same time the outlet valve 43 is in its blocking operational position (which, in the case illustrated, corresponds to a situation in which a defined, "medium" brake pressure is applied to the wheel brakes 11, 12 and therefore the control piston 82 assumes a center equilibrium position in which the actuation force $K_B$ is sufficient to keep the valve ball 96 in its operational position in which it blocks the outlet valve 43), the valve ball 96 of the outlet valve 43, is acted on, on that surface $F_K$ which is bounded by the circular contour line 101 at which the valve ball 96 rests on the valve seat 93 of the outlet valve 43, by the pressure prevailing in the outlet pressure chamber 47 which is the brake pressure $P_B$, the resulting force $K_B$, which acts on the valve ball 96 in the direction of the arrow 102, being directed counter to the actuation force $K_B$ and being equal to it in terms of its absolute value.

The valve ball 96 of the outlet valve 43 and its conical valve seat 93 are expediently dimensioned and designed in such a way that the area $F_K$ within which the valve ball 96 is acted on in the opening direction by the prevailing brake pressure $P_B$ (from outlet pressure chamber 47) is approximately equal to (and preferably somewhat smaller than), the clear cross-sectional area of the axial guide hole 84 which opens into the outlet pressure chamber 47, within which axial guide hole 84 the guide section 83 of the control piston 82 is itself acted on by the brake pressure $P_B$ prevailing in the outlet pressure chamber 47. As a result, the restoring force which opposes the actuation force $K_B$ acts on the control piston 82. In a specific design, the area $F_K$ is approximately 95% of the clear cross-sectional area of the axial guide hole 84.

The limit position of the control piston 82 which corresponds to minimum residual brake pressure as the brake pedal is released (and also to the non-actuated state of the brake system) is determined by contact of the pedal-end, annular end face 103 of the block-shaped flange 91 against a spacing disc 104 through which the axial plunger 97 of the actuation piston 98 passes. The first, block-shaped centering element 59 is supported by the spacing disc 104 on the free, annular end face 106 of the cylindrical outer surface 107 of a pot-shaped sealing ring retainer 108. The base component 109 of ring retainer 108 (which has a through-hole 110 through which the guide section 83 of the control piston 82 passes and which is aligned with the axial guide hole 84 of the central housing block 58) is axially supported on a radial step face 111 of the central housing block 58 between the axial guide hole 84 and the guide hole 112, which is larger in terms of diameter and forms the radially outer boundary of the relief chamber 56.

So that, even in the limit position of the control piston 82, brake fluid can overflow out of the outlet pressure chamber 47 of the brake valve 28 into the relief chamber 56 and via the latter to the brake fluid reservoir vessel, the block-shaped flange 91A of the actuation piston 82 is provided with radially continuous transverse passages 113 which open into the through-hole 92 of the flange 91 in the immediate vicinity of the valve seat 93.

Referring to FIG. 2, the other limit position of the control piston 82, which corresponds to maximum actuation force and the production of maximum brake pressure, is determined by contact of a radial flange 146 of the actuation piston 98 against an annular stop face 115 of the first centering element 59 (penetrated by the axial plunger 97 of the actuation piston, of the valve housing 48) and is associated with a position of the control piston 82 in which the valve ball 79 of the inlet valve 44 is lifted off as far as possible from its seat 76 and assumes approximately the position indicated by broken lines in FIG. 3. In the latter position of the control piston 82, the annular end face 116 of the block-shaped flange 91A (which faces the base 109 of the sealing ring retainer 108) is still arranged at a small axial distance from the base component 109. The high-pressure-proof seal between the outlet pressure chamber 47 and the relief chamber 56 of the flow valve 28 (when the outlet valve 43 is closed) is provided by an annular seal 117, constructed for example as an O ring, which rests in a sealing fashion against the outer surface of the guide section 83 of the control piston 82, and is rigidly clamped between an annular bead 118 in the base component 109 of the sealing ring retainer 108 and the radial step face 111 of the central, block-shaped housing component 58. The O ring 117 seals off the axial guide hole 84, penetrated by the guide section 83, both from the outside and also with respect to the relief chamber 56, but opposes displacement of the control piston 82 with only a moderate frictional resistance, equivalent to a moderate pressure of approximately 2 to 5 bar.

The external diameter of the outer component 107, extending between the spacing disc 104 and the base component 109 of the sealing ring retainer 108, is somewhat smaller than the diameter of the larger hole step 112 into which the sealing ring retainer 108 is inserted. Thus, a narrow annular space 119 surrounds the outer component 107 in the axial direction, and communicates with the inner component of the relief chamber 56 by means of continuous radial transverse passages 121.

The relief chamber 56 is sealed off from the housing space 161 (FIG. 2), which is enclosed by the tubular housing component 61 and opened towards the brake pedal 17, by a sealing ring 122 (best seen in FIG. 4) which surrounds the cylindrical axial plunger 97 of the actuation piston 98. The sealing ring 122 is clamped in a sealing way between a chamber-side annular bead 123 of the block-shaped centering element 59 and the spacing disc 104 which is supported thereon, and opposes the control movements of the plunger 97 and of the actuation piston 98, once again with, at most, only a small frictional resistance, equivalent to a pressure of approximately 2 to 5 bar.

The relief chamber 56 is sealed from the outside by an O ring 124 which is clamped between the inner, cylindrical surface of a centering flange 125 that projects a short distance axially from the central block-shaped housing component 58 and the base of a circumferential groove 126 of a block-end centering section of the first, block-shaped centering element 59. Similarly, the outlet pressure chamber 47 and the inlet pressure chamber 45 are sealed off from the outside by means of sealing rings 126 and 127, respectively, which are arranged between circumferential grooves of the second centering element and outer surfaces, closing off the said circumferential grooves, of the centering ribs of the central, block-shaped housing component 58 and of the housing termination block 63.

The housing components which have been explained thus far are pressed axially one against the other and held together by means of anchoring screws 128 (FIG. 2), which are provided in an axially symmetrical grouping with respect to the central axis 53. The heads of screws 128 are supported at the end of the housing termination block 63 remote from the pedal, while the threaded portions extend through aligned holes in the housing termination block 63 and the central housing block 58 and engage with axial threads of the tubular housing component 61.

The tubular housing component 61 has a valve-end section 129, which adjoins the first centering element 59 and has a larger diameter, while a pedal-end section 131 which is open towards the brake pedal has a somewhat smaller diameter. The pedal-end section is radially offset with respect to the valve-side section 129 by a radial stop step 132. An elongated cylindrical pot shaped sliding element (designated in its entirety by reference numeral 133), which has its base component 134 oriented towards the brake pedal 17 and its outer component 136 towards the first centering element 59, is adapted to slide forward and backward in the pedal-end section 131 of the tubular housing component. This sliding element 133 (on whose base component 134 the pedal plunger 137 articulated on the brake pedal 17 acts centrally) is pressed into its initial position (FIG. 2) associated with a non-actuated state of the power brake system 10, by a weakly prestressed helical spring 138 which is axially supported at one end on the first centering element 59 and at its other end on the inside, facing the said centering element 59, of the base component 134 of the sliding element 133. Together the sliding element 133 and spring 138 form the travel simulator 27 (FIG. 1). The initial position of sliding element 133 is determined by contact between a radial stop flange 139 of the outer component 136 of the sliding element 133 against the radial stop step 132 of the tubular housing component 61. The maximum travel of the sliding element 133, which corresponds to the maximum azimuthal deflection of the brake pedal 17 about its pivot axis 141 (fixed to the vehicle body) via the pedal plunger 137, is limited, on the other hand, by contact of the radial stop flange 139 against the radially outer annular end face 142 of the first, block-shaped centering element 59. The axial length of the outer component 136, within which the sliding element 133 coaxially surrounds the helical spring 138, is slightly greater than the block length of the helical spring 138.

The side of first block-shaped centering element 59 which faces the sliding element 133, has a cylindrical pot-shaped depression 143 with an annular, radial base face 144 which supports one end of a disc spring packet 114 which is provided as a restoring spring. The other end of the disc spring packet is supported on the radial flange 146 of the actuation piston 98 which guides the axial displacement of the piston within the cylindrical pot-shaped depression 143 of the first block shaped centering element 59.

The side of the radial flange 146 of the actuation piston 98 which faces away from the disc spring packet 114 supports one of the ends of a weakly prestressed helical spring 147, the other end of which is supported on a radial flange 148 of an anchoring sleeve 149. The action of the helical spring 147 presses the anchoring sleeve 149 into a maximum axial displacement from the radial flange 146 of the actuation piston 98, which displacement is limited by the stop action of a radial inner shoulder 151 of the anchoring sleeve 149 with a stop head 152 of the actuation piston 98. The stop head 152 forms the end nearest the pedal, of an anchoring rod 153 which starting from the radial flange 146, penetrates part of the anchoring sleeve 149 and is supported, at the pedal-end, by the stop head 152 on the inner shoulder 151 of the anchoring sleeve.

The position of the anchoring sleeve 149 shown in FIG. 2 corresponds to the non-actuated state of the brake system 10 or of the brake valve 28. In this position, the radial flange 148 at the pedal-end of the anchoring sleeve 149 is at an axial distance of 1 to 2 mm from an annular, radial stop shoulder 154 of the base component 134 of the sliding element 133. This distance corresponds to a short idle motion of the brake pedal, and approximately $\frac{1}{20}$ to $\frac{1}{10}$ of the maximum actuation travel which the sliding element 133 executes if it is displaced from its illustrated normal position (corresponding to the non-actuated state of the brake system), as far as its limit position which corresponds to maximum brake pressure. (In the latter position—not shown—the radial stop flange 139 of the sliding element 133 rests against the annular end face 142 of the first centering element 59, and the end face 156 of the anchoring sleeve 149 rests against an extension 157 of the radial flange 146 of the actuation piston 98 which centers the central helical spring 147.)

The base component 134 of the sliding element 133 is provided with a central, axial blind hole 158 which receives the stop head 152 of the anchoring rod 153 so that the sliding element 133 can be displaced as far as its position corresponding to maximum brake pressure. In addition, the base component 134 also has a relief hole 159 which opens into the bottom of the blind hole 158 and permits air to escape from the inner space 161 of the brake valve housing 48 when the brake valve 28 is actuated. The inner space 161 is delimited in the radial direction by the tubular housing component 61 and is delimited in the axial direction in a movable way by the sliding element 133.

When a braking operation is commenced starting from the normal positions (illustrated in FIG. 2) of the brake pedal 17 and of the individual operational elements of the brake valve 18, the sliding element 133 initially executes a small idle motion until it strikes the radial flange 148 of the anchoring sleeve 149 with its stop shoulder 154. Thereafter, however, no displacement of the actuation piston 98 occurs until there is increasing compression of the elongated, weakly prestressed helical spring 147, whose prestressing is low with respect to that of the travel simulation spring 138, and of the disc spring packet 114, whose prestressing is again low with respect to that of the elongated helical spring 147. When such displacement does occur, the valve ball 96 of the initially still open inlet valve 43 moves into sealing contact with the valve seat 93, so that the inlet valve 43 is closed. As soon as the actuation force which acts in the direction of the arrow 99, on the valve ball 96 and the control piston 82 (FIG. 4), is sufficient to overcome the static friction effective on the sealing ring 83, the control piston 82 is displaced in the direction of the actuation force, so that the free end of the actuation plunger 86 moves into contact with the valve ball 79 of the (initially still closed) inlet valve 44, which is pressed against its seat 76 by the "closing" force given by the relation (1). As soon as this force is overcome by further displacement of the sliding element 133 and the concomitant increase in the force exerted on the actuation piston 98 via the helical spring 147, the valve ball 79 is lifted off from its seat 76. As a result, the restoring-force component $F_1 \cdot P_S$ (which theretofore resulted from the application of pressure to the valve ball on the "seat" area $F_1$ using the outlet pressure $P_S$ of the pressure accumulator 19, i.e. on the area which is bounded by the contact line along which the ball 79 rests on the seat face 76 when the valve is closed), is in fact eliminated. However, owing to the constricting effect of the peripheral annular gap 89 and to the resulting retention of the brake-fluid flow at the valve ball 79, a restoring force of a comparable magnitude builds up again. This restoring force prevents the inlet valve 44 from opening too rapidly, which would make the pressure build-up in the outlet pressure chamber 47 difficult to meter. This constriction is particularly significant if the driver would like to apply only a relatively low brake pressure to the wheel brakes 11, 12, (that is, would like to precisely meter the brake pressure in the case of a relatively low actuation force and also with correspondingly small degrees of travel of the valve ball 79 of the inlet valve 44).

If, on the other hand, the driver wishes to obtain a high degree of deceleration of the vehicle, it is necessary to actuate the brake pedal 17 with a large pivot travel and correspondingly large axial deflection of the sliding element 133. Such actuation causes the valve ball 79 of the inlet valve 44 to jump out of the tubular section 88, which defines the constriction point 89, into the central axial hole 64 of the housing termination block 63. In this case, therefore, the rate of increase of pressure in the pressure outlet chamber 47 is limited by the restrictor formed by the annular passage 87 and the actuation plunger 86 of the control piston 82, and the ability to satisfactorily meter the brake pressure is ensured by the fact that changes in the actuation force which the driver is still capable of exerting (and which are necessary to change the brake pressure) are in any case relatively small compared to the absolute value of the force which the driver has to apply counter to the restoring force of the travel simulation spring 138.

In order to explain a typical configuration of the brake valve 28 it will be assumed that the external diameter of the plunger-shaped guide section 83 of the control piston 82 is approximately 4 mm, which corresponds to a value of 0.126 $cm^2$ of the effective cross-sectional area $F_S$, within which the control piston 82 is acted on during braking, by the pressure $P_S$ prevailing in the outlet pressure chamber 47. Furthermore, it will be assumed that the transmission ratio of the pedal has a value of $\frac{1}{5}$ and the maximum travel which the sliding element 133 can execute between its normal position (corresponding to the non-actuated state of the brake system) and the limit position (corresponding to the maximum outlet pressure of for example 180 bar) amounts to 4 cm.

Given these assumptions, it is found that the maximum absolute value of the prestressing which the transmission spring 147—compressed by 4 cm—must produce is approximately 200N, which corresponds to a spring rate $C_B$ of this spring 147 of 50 N/cm. On the further assumption that the maximum force $K_P$ which the driver is capable of exerting on the brake pedal 17 is approximately 400N and consequently that an actuation force of, in total, 2000N can be exerted on the sliding element 133 (due to the assumed pedal transmission ratio of $\frac{1}{5}$), for this case it must be possible for the reaction spring 138, which has been designated as the travel simulator, still to produce an additional restoring force of 1800N, which corresponds to a spring rate $C_R$ of 450 N/cm.

The spring rate of the disc spring packet 114 which is used merely as a restoring spring and by means of which the actuation piston 98 can be displaced to such an extent that the valve ball 96 of the outlet valve 43 can lift off from its seat in the non-actuated state of the brake valve 28, is to be small with respect to the spring rate $C_B$ of the transmission spring 147.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Valve arrangement for controlling brake pressure in a hydraulic power-brake system of a vehicle, in which arrangement, actuation of a brake valve, causes a pressure proportional to an actuation force to be built up in an outlet pressure chamber connected to a brake circuit of the vehicle, said pressure being variable between a first, high, output pressure level of a pressure accumulator provided as pressure source, and a second pressure level, corresponding to a low ambient pressure of a brake fluid reservoir vessel of the brake system, by means of a first ball-seat valve which is acting as a 2/2-way valve and which, as a result of axial displacement of an actuation piston on which an actuation force acts, is movable out of its open position, which is assumed in the non-actuated state of the brake valve and in which the outlet pressure chamber is connected via this first ball-seat valve to a relief chamber of the brake valve with a continuously communicating connection to the brake fluid reservoir vessel, into a blocking position in which a valve ball is pressed in sealing contact against a seat which is arranged on an axially displaceable control piston of the brake valve, and a second ball-seat valve which is designed as a 2/2-way valve and which normally occupies a blocking position in which a brake valve inlet pressure chamber that is continuously subjected to the high outlet pressure of the accumulator is blocked off with respect to the outlet pressure chamber, and which second ball-seat valve, after the first ball-seat valve has moved into its blocking position, moves, as a result of further axial displacement of the actuation piston and of a control piston, out of the blocking position, into an open position which connects the inlet and outlet valve chambers to one another, and returns to its blocking position again, as an equilibrium position which corresponds to equality between the actuation force acting on the control piston and a reaction force resulting from the application of pressure to its piston face which is subjected to the outlet pressure, wherein:

the actuation piston is mechanically engagable with the valve ball of the first ball-seat valve to press said valve ball into sealing contact with its seat;

the valve seat of the first ball-seat valve is arranged on the control piston, which is axially displaceable to move the second ball-seat valve, whose seat is fixed relative to the housing, into its open position;

in a normal position of the control piston corresponding to the non-actuated state of the brake valve, the control piston is disposed at a defined axial distance, which is small relative to a maximum possible travel thereof, from the valve ball of the second ball-seat valve and has a continuous central longitudinal passage which has a continuously communicating connection to the outlet pressure chamber of the brake valve, but in the blocking position of the first ball-seat valve is blocked off with respect to the relief chamber of the brake valve;

a pressure-medium flow paths which is cleared by opening-actuation of the second ball-seat valve and which leads from the pressure accumulator to wheel brakes via the inlet pressure chamber, the first ball-seat valve and the outlet pressure chamber of the brake valve as well as the main brake line of the brake circuit connected to the outlet pressure chamber, has a restrictor which limits the maximum rate of increase of brake-pressure rate to a prescribed value; and a further restrictor gap is bounded by the valve ball of the second ball-seat valve in a tubular section of the central through-passage, adjoining the valve seat of the second ball-seat valve and extending between the inlet pressure chamber and the outlet pressure chamber, of the valve housing.

2. Valve arrangement according to claim 1, wherein:

the restrictor which limits the maximum value of the rate of increase of the brake-pressure is connected between a pressure outlet of the brake valve and wheel brake or brakes connected thereto.

3. Valve arrangement according to claim 1, wherein:

the restrictor which limits the maximum value of the rate of increase of the brake-pressure is constructed as an adjustable restrictor.

4. Valve arrangement according to claim 1, wherein:

a flow path which is hydraulically connected in parallel with the restrictor which limits the maximum rate of increase of the brake-pressure, and which leads via a non-return valve which can be blocked by the outlet pressure of the brake valve and is acted on in the opening direction by higher pressure in the connected brake circuit than at the pressure outlet of the brake valve, the flow resistance of the said flow path being substantially lower than that of the restrictor.

5. Valve arrangement according to claim 1, wherein:

the restrictor which limits the maximum rate of increase of the brake-pressure is integrated into the brake valve.

6. Valve arrangement according to claim 5, wherein:

the restrictor is formed by an annular passage which extends in the axial direction and is bounded radially on the inside by a plunger, which is provided for opening-actuation of the second ball-seat valve and is constructed as an axial extension of the control piston, and is delimited radially on the outside by a hole, which opens inside the seat of this valve and is axially penetrated by the plunger, in the valve housing.

7. Valve arrangement according to claim 6, wherein:

the valve seat of the second ball-seat valve compresses a conical seat surface in the shape of a circular cone with an aperture angle of 130°±10°; and a diameter $d_2$ of the valve ball of the second ball-seat valve is between three and four times larger than a diameter $d_1$ of the central through-hole of the housing, which bounds the restrictor radially on the outside.

8. Valve arrangement according to claim 7, wherein:

the central through-hole adjoins the conical-seat surface with a smooth curvature.

9. Valve arrangement according to claim 1, wherein:

the maximum opening travel of the valve ball of the second ball-seat valve, is larger than an axial extent of the tubular section which adjoins the valve seat of the second ball-seat valve within which the valve ball is axially movable.

10. Valve arrangement according to claim 9, wherein:

a tubular housing section which externally bounds the restrictor adjoins a valve-side axial delimitation of the inlet pressure chamber with a smooth curvature.

11. Valve arrangement according to claim 1, wherein:

a transmission spring is provided to convert a portion of the pedal force exerted by a vehicle driver, by means of a brake pedal, on a sliding element which can be displaced axially in the housing of the brake valve, into an actuation force for brake-pressure control actuation and which acts on the actuation piston of the brake valve, which transmission spring is axially compressible by displacement of the sliding element, said transmission spring acting on a radial supporting flange of the actuation piston and being supported in the central area of the sliding element; and a second reaction spring which surrounds the transmission spring coaxially and is supported on the sliding element on the one hand and on a supporting face which is fixed to the housing on the other hand and whose spring travel corresponds at least to that of the transmission spring, is provided.

12. Valve arrangement according to claim 11, wherein a ratio of the spring rate of the transmission spring with respect to a spring rate of the reaction spring has a value in a range of 1/6 and 1/12, preferably a value around 1/10.

13. Valve arrangement according to claim 11, wherein:

the transmission spring is anchored to the actuation piston; and a radial end flange, of a sleeve which is provided for anchoring the transmission spring is displaceable axially in relation to the actuation piston, said radial end flange having a normal state which corresponds to the non-actuated state of the brake valve at a small axial distance from the sliding element, which distance corresponds to a fraction of 1/20 to 1/10 of the maximum displacement path of the sliding element.

* * * * *